United States Patent [19]

Brown et al.

[11] 4,188,168

[45] Feb. 12, 1980

[54] BOW AND SPREADER BAR

[75] Inventors: William J. Brown, Lower Burrell; James R. Rowley, Freeport, both of Pa.

[73] Assignee: PPG Industries, Inc., Pittsburgh, Pa.

[21] Appl. No.: 911,598

[22] Filed: Jun. 1, 1978

[51] Int. Cl.² ............................................. B65G 67/24
[52] U.S. Cl. ............................... 414/786; 294/81 R; 294/74; 296/36
[58] Field of Search ........................... 414/786, 373; 294/74–77, 81 R, 67 E, 67 EA, 67 R; 296/36, 28 R, 28 M

[56] References Cited

U.S. PATENT DOCUMENTS

| | | | |
|---|---|---|---|
| 3,837,702 | 9/1974 | Case | 296/36 |
| 4,066,287 | 1/1978 | Rowley | 294/74 |

*Primary Examiner*—Albert J. Makay
*Attorney, Agent, or Firm*—Donald Carl Lepiane

[57] ABSTRACT

A bow and spreader bar has adjustable telescoping members for mounting slings thereon when lifting glass sheets and a pin mounted on the end of each telescoping member to mount the bar in holes provided on sides of an open-top trailer. In the mounted position, the bar supports the protective covering and aids in maintaining the trailer walls in spaced relationship to one another.

6 Claims, 8 Drawing Figures

U.S. Patent  Feb. 12, 1980  Sheet 1 of 2  4,188,168
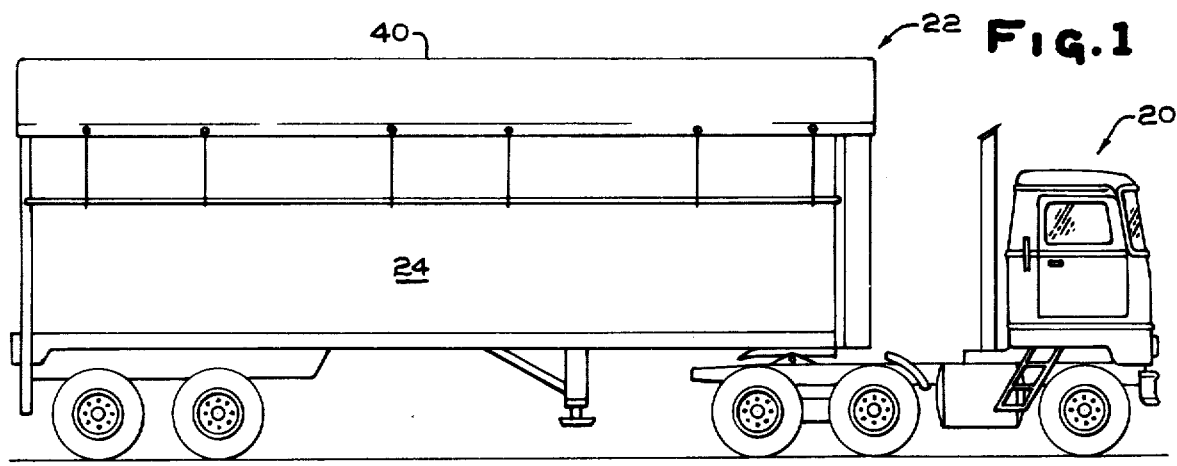
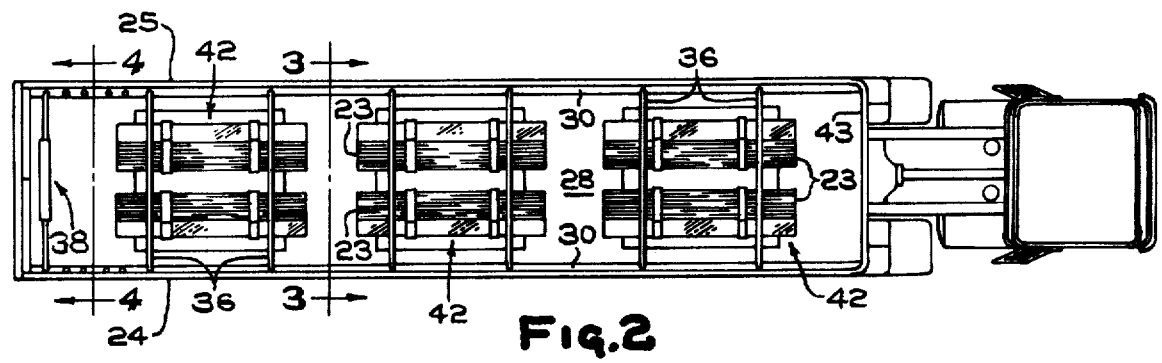
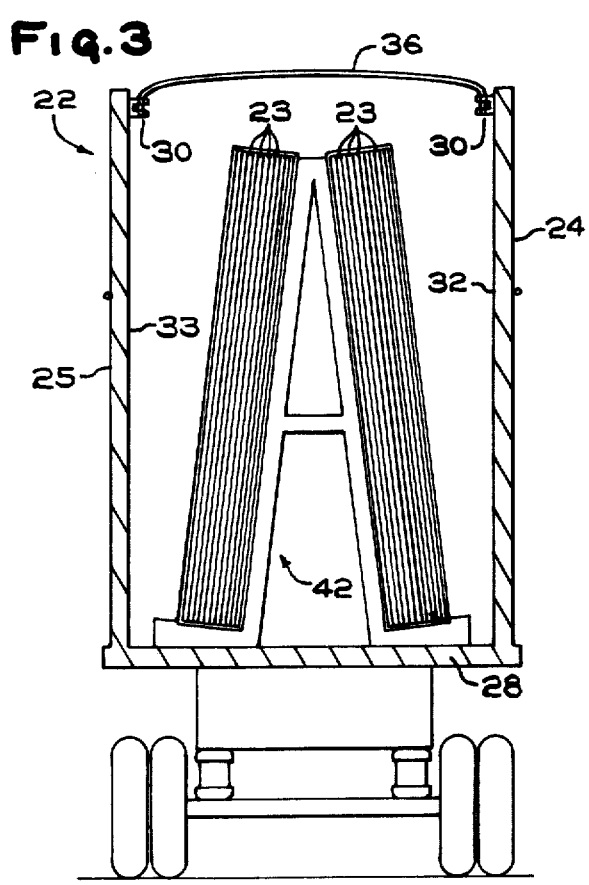
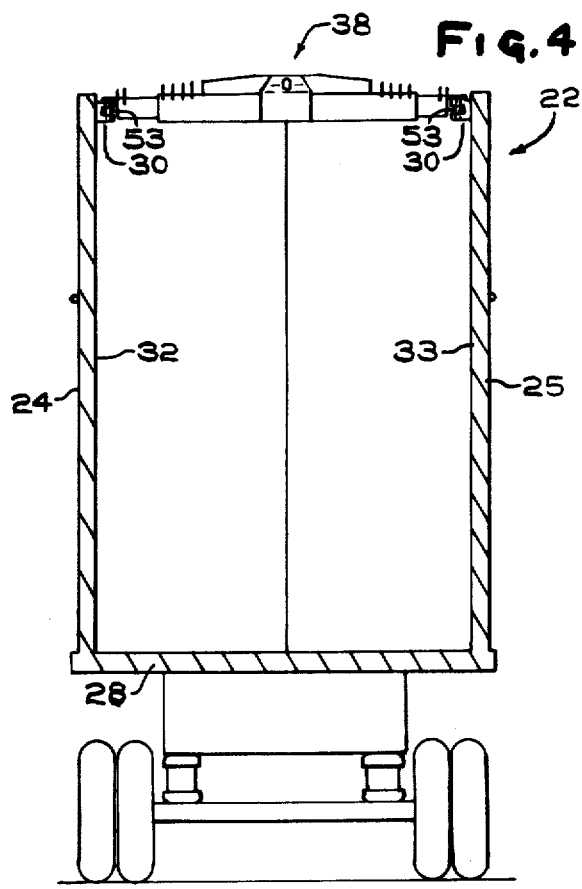

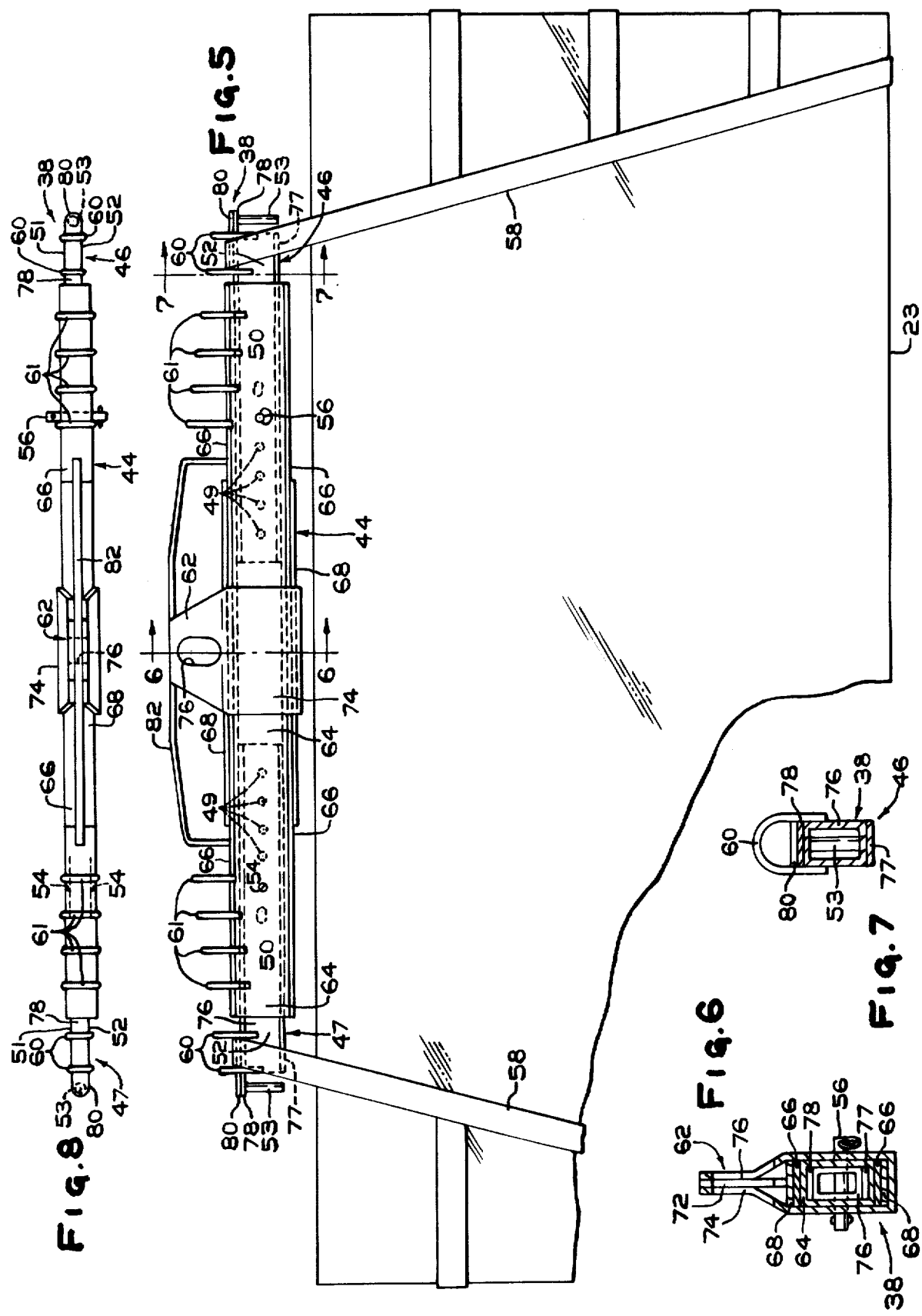

BOW AND SPREADER BAR

BACKGROUND OF THE INVENTION

1. Field of Invention

This invention relates to a spreader bar for lifting sheets and a bow bar for supporting a covering for open-top trailers.

2. Discussion of the Prior Art and Technical Problems

One mode of transporting glass sheets between supplier and customer is by securing the glass sheets on collapsible frames or racks mounted on the bed of open-top trailers, e.g., trailers of the type taught in U.S. Pat. Nos. 2,969,284 and 3,066,924. The glass sheets are loaded on or unloaded from the frames by slings mounted on a spreader bar, e.g., of the type taught in U.S. Pat. Nos. 2,721,757; 3,193,880; 3,549,190; and 3,897,097. To assure the availability of a spreader bar, one is normally carried on the trailer. Providing each trailer with a spreader bar solves the problem of availability but poses problems of handling and/or storage. More particularly, the spreader bar normally weighs about 300 pounds (135 kilograms) and is handled by the driver of the truck. One person moving the bar on the trailer bed or floor in position to be connected to the hook of a crane is difficult and can pose a hazard. The prior art spreader bars are not easily stored when the trailer is empty and the trailer bed prepared for receiving return pay load. For example, the frames used for supporting the glass are collapsed and secured at the front end of the trailer to maximize available floor space. Because there are no provisions for storing the spreader bar, it remains on the trailer floor decreasing available floor space for the return pay load.

It would be advantageous, therefore, to provide a spreader bar that does not have the drawbacks of the prior art spreader bars.

SUMMARY OF THE INVENTION

This invention relates to a spreader and bow bar for use in combination with an open-top trailer of the type having a deck, a pair of spaced walls mounting the deck and facilities mounted on the walls for supporting a plurality of bow bars. The spreader and bow bar has a rigid elongated body having facilities, e.g., pins, mounted thereon and coacting with the support facilities, e.g., a channel having holes therein, for mounting the bow and spreader bar between the walls of the trailer. Spaced members mounted the rigid body for containing a pair of glass lifting slings in spaced relationship to one another.

This invention also relates to a method of handling sheets wherein the method includes the steps of loading the sheets on a support member mounted on the bed of an open-top trailer and includes the steps of mounting a pair of glass slings in spaced relationship to one another on a rigid bar and mounting the slings about a glass pack. Thereafter, the glass pack is positioned on the support members using the bar and slings. The slings are removed from the pack, and the pack is secured on the support members. Thereafter, the bar is mounted on the walls of the trailer.

BRIEF DESCRIPTION OF THE DRAWING

FIG. 1 is a side elevated view of a truck and an open-top trailer having a canvas mounted thereon which trailer may be used in the practice of the invention;

FIG. 2 is a top elevated view of the truck and trailer shown in FIG. 1 with the canvas removed to show the spreader and bow bar incorporating features of the instant invention; the cargo in the trailer; and the bow bars for supporting the canvas;

FIG. 3 is a view taken along lines 3—3 of FIG. 2;

FIG. 4 is a view taken along lines 4—4 of FIG. 2;

FIG. 5 is an illustration having portions removed of the spreader and bow bar of the instant invention lifting a pack of loose glass sheets;

FIG. 6 is a view taken along lines 6—6 of FIG. 5;

FIG. 7 is a view taken along lines 7—7 of FIG. 5; and

FIG. 8 is a top elevated view of the spreader and bow bar shown in FIG. 5 having the slings and glass sheets removed for purposes of clarity.

DESCRIPTION OF THE INVENTION

In FIG. 1, there is shown a truck 20 and trailer 22 of the type used in the art for shipping glass sheets 23. With reference to FIGS. 2 and 3, the trailer 22 has a pair of spaced walls 24 and 25 mounted on bed or deck 28 and a channel 30 mounted on inside surface 32 and 33 of the wall 24 and 25, respectively. The channels 30 support (1) a plurality of bow bars 36 of the type used in the art and (2) at least one bow and spreader bar 38 incorporating features of the instant invention. The bow bars 36 and bar 38 (1) provide support for a canvas or tarpaulin 40 (shown only in FIG. 1) for protecting the cargo of open-top trailers from the environment and (2) provide structural stability by maintaining the trailer walls 24 and 25 in spaced relationship to one another.

The glass sheets 23 are secured in any conventional manner on A-frames 42 of the type used in the art. The A-frames are preferably of the type that are mounted on the trailer bed 28 for supporting the glass sheets; and after removal of the sheets, the frames are collapsed and stored adjacent the front end or nose wall 43 of the trailer to provide deck space for return pay load or shipment. As will be appreciated, the invention is not limited to the type of truck 20, trailer 22, A-frames 42 or sheets 23 that may be used in the practice of the invention.

Referring now to FIGS. 5 and 8, the bow and spreader bar 38 has a central main member 44 for slidably receiving arm members 46 and 47 at each end. The arm members 46 and 47 each have (1) a plurality of holes 49 and a groove 50 formed on opposed surfaces 51 and 52 (shown in FIG. 8) and (2) a stud 53 mounted at the free end as shown in FIG. 5. Selected ones of the holes 49 or the groove 50 of the members 46 and 47 are aligned with respective ones of a pair of spaced holes 54 (shown on left side of member 44 as viewed in FIGS. 5 and 8) to receive a locking pin 56 (one only shown in FIGS. 5 and 8) to set the bar 38 at a predetermined length.

When the bar 38 is used for lifting glass sheets 23, a sling 58 is mounted between fingers or upright members 60 on the arms 46 and 47 and/or fingers or upright members 61 on the central member 44. The slings 58 are mounted about the glass sheets as is known in the glass sheet lifting art and the bar 38 lifted by a crane (not shown) connected to bail 62. When the bar 38 is used as a bow for supporting the canvas 40, the length of the bar 38 is adjusted so that the studs 53 of the arms 46 and 47 are mounted in holes (not shown) in respective ones of the channels 30 mounted on trailer walls 24 and 25.

Although not limited to the invention, it is recommended that the groove 50 of the arms 46 and 47 be aligned with its respective hole 54 of the member 44 when mounting the bar 38 in the channels 30 of the truck wall. In this manner, the length of the bar can be easily adjusted to facilitate the mounting of the studs 53 in the channels 30 (see FIG. 4). Further, it is recommended that the height of the fingers 60 and 61 of the arms 46 and 47 and member 44, respectively, be adjusted to slope the supported canvas for mositure run-off.

As can now be appreciated, variations can be made to the spreader and bow bar 38 without deviating from the scope of the invention. For example, structural reinforcement of the bar 38 may be accomplished by using plate members in place of thicker tubing to minimize bending moments while minimizing the weight of the bar. Further, the invention is not limited to the type of glass slings that may be used to engage the glass sheets and any of the types known in the glass handling art may be used in the practice of the invention. Further, the spreader and bow bar 38 are not limited to lifting loose glass sheets and may be used for lifting glass sheets packed in crates, as well as for lifting metal sheets, wood sheets, crates or any other type of cargo normally shipped in trailers.

DETAILED DESCRIPTION OF THE INVENTION

With reference to FIGS. 5–8, bow and spreader bar 38 of the invention have a central main member 44 having (1) a steel hollow tubing 64 having a length of about 76½ inches (1.9 meters); a height of about 6 inches (15.24 centimeters); a width of about 3 inches (7.62 centimeters) and a wall thickness of about 5/16 inch (0.8 centimeter ); (2) a steel plate 66 having a width of about 3 inches (7.62 centimeters); a length of about 69¾ inches (1.75 meters); and a thickness of about 3/16 inch (0.64 centimeter) on the top and bottom surface of the central main portion as viewed in FIGS. 5 and 6; and (3) a second steel plate 68 having a length of about 31½ inches (0.78 meter), a width of about 2¼ inches (5.72 centimeters) and a thickness of about 0.1644 inch (0.42 centimeter) on each of the plates 66 as shown in FIGS. 5 and 6. The plates 66 and 68 are symmetrical with the center of the steel hollow tube 64 and provide a central main member 44 having structural stability against bending moments while minimizing its weight. A pair of holes 54 each having a diameter of about 17/32 inch (1.35 centimeters) are provided on opposed sides of the hollow tube 64 on a center-to-center spacing of about 58¼ inches (1.46 meters) for receiving locking pin 56 (one pin 56 and one pair of holes 54 shown in FIGS. 5 and 8).

As shown in FIG. 6, bail 62 has an elongated steel plate 72 about ⅜ inch (0.95 centimeter) thick and about 6 inches (15.24 centimeters) high welded to the top plate 68 of the main member 44. Also referring to FIGS. 5 and 8, the bail 62 has a steel plate 74 having a length of about 31 inches (0.79 meter), a maximum width of about 15½ inches (0.38 meter), and a thickness of about ⅜ inch (0.95 centimeter) formed around and welded to the central member 44 and plate 72 to provide structural stability to the bail 62. A hole 76 provided in plates 72 and 74 of the bail 62 receives a crane hook (not shown) for lifting the bar 38.

With reference to FIGS. 5–7, sliding arms 46 and 47 are each made of (1) a hollow steel tubing 76 having a height of about 5 inches (12.7 centimeters), a width of about 2 inches (5.08 centimeters), a wall thickness of about ¼ inch (0.64 centimeter) and a length of about 38½ inches (0.99 meter) (2) a welded bottom steel plate 77 having a width of about 2¼ inches (5.8 centimeters), a thickness of about 0.1644 inch (0.42 centimeter) and a length of about 38½ inches (0.99 meter); and (3) a welded top steel plate 78 having similar width and thickness dimensions as the plate 77 but a length of about 41¾ inches (1.05 meters) to extend about 3¼ inches (8.26 centimeters) beyond the tubing 76 as shown in FIG. 5 to support a stud 53. The stud 53 having a length of about 5 inches (12.7 centimeters) and a diameter of about ⅞ inch (2.20 centimeters) is welded to the plate 78. A reinforced plate 80 having a width of about 2¼ inches (5.8 centimeters); a length of about 7¾ inches (19.7 centimeters) and a thickness of about 0.1644 inch (0.42 centimeter) mounts the outboard portion of the plate 78 as shown in FIG. 5 to prevent bending moments of the stud 53 when the bar 38 is supported by the members 30 of the trailer 40 as shown in FIG. 4. A plurality of holes 49 each having a diameter of about 17/32 inch (1.3 centimeters) and a groove having a length of about 1 inch (2.54 centimeters) are in opposed sides of the arms 47 and 48 on a center-to-center spacing of about 3⅞ inches (7.6 centimeters).

Two fingers 60 are mounted on each arms 47 and 48 and four fingers 61 are mounted on the central member 44 on each side of the bail 62. Each of the fingers 60 and 61 are made of steel rod having a diameter of about ⅜ inch (0.95 centimeter) and are mounted relative to one another to provide a spacing of about 3⅜ inches (8.6 centimeters) for receiving a glass sling 58 of the type used in the art and having an incremental height difference of about 7/16 inch (1.2 centimeters) to provide a slope to the bar 38 similar to slope of the bows 36 (see FIGS. 3 and 4). To slope the central portion of member 44, L-shaped steel rods 82 having a diameter of about ⅜ inch (0.95 centimeter), a length of about 4¼ inches (10.8 centimeters) for the short leg and a length of about 18 9/16 inches (0.47 meter) for the long leg are mounted about the bail 62 as shown in FIGS. 5 and 8.

In the practice of the invention, the bar 38 is extended to a length of about 112 inches (2.8 meters) and a quick release pin 56 is passed through aligned ones of the holes 54 and 49 of the member 44 and arm members 46 and 47, respectively. A glass sling 58 is mounted between the fingers 60 of each arm 46 and 47. The slings 58 are positioned about the ends of a stack of 5 glass sheets each having a length of about 130 inches (3.3 meters); a height of about 96 inches (2.5 meters) and a thickness of about ¼ inch (0.64 centimeter). A crane hook (not shown) mounted in bail hole 76 lifts the bar 38 loaded with glass sheets into the trailer 22 and onto a selected rack 42 in any conventional manner. Thereafter, the slings 58 are removed and the glass sheets secured to racks 42 in any conventional manner.

After the racks 42 are loaded and in accordance to the teachings of the invention, the pins 56 are removed and the grooves 50 of each arm 46 and 47 aligned with its respective hole 54 of member 44. Thereafter, the pins 56 are inserted through the holes 50 of the main member 44 and grooves 50 of the arms 46 and 47. Bows 36 and bar 38 are mounted in the channels 30 of the trailer 24 as shown in FIGS. 3 and 4 and a canvas 40 spread over the bows 36 and 38 and held in position in any conventional manner. The glass sheets are normally removed by practicing the above steps in the reverse order.

As can be appreciated, the invention is not limited to the above example which is presented for illustration purposes only.

What is claimed is:

1. A method of loading a pack of sheets on frames mounted on bed of an open-top trailer, comprising the steps of:

mounting a pair of sheet slings in spaced relationship to one another on a rigid bar;

mounting the slings about ends of the pack;

lifting the bar containing the sheets to position the sheets on the frames;

removing the slings from the ends of the pack; and mounting the bar to and between walls of the trailer to aid in maintaining the walls in spaced relationship to one another.

2. The method as set forth in claim 1 further including the step of:

securing bow bars between and to the walls of the trailer;

mounting a canvas on the rigid bar and on the bow bars; and securing the canvas in position.

3. The method as set forth in claim 2 wherein the sheets are glass sheets.

4. A method of unloading sheets from frames mounted on bed of an open-top trailer, comprising the steps of:

removing a rigid bar mounted to and between walls of the open-top trailer;

mounting slings on the rigid bar;

mounting the slings about the sheets mounted on the frames; and lifting the rigid bar having the sheets thereon to remove the sheets from the trailer.

5. The method as set forth in claim 4 wherein a canvas is mounted over the trailer supported in part by the rigid bar and further including the step of:

removing the canvas before practicing said removing step.

6. The method as set forth in claim 5 wherein the sheets are glass sheets.

* * * * *